(12) United States Patent
Huang et al.

(10) Patent No.: US 12,508,909 B2
(45) Date of Patent: Dec. 30, 2025

(54) ELECTRONIC DEVICE PROVIDED ON TRANSPORT DEVICE

(71) Applicant: CARUX TECHNOLOGY PTE. LTD., Singapore (SG)

(72) Inventors: Ta-Chin Huang, Tainan (TW); Ching-I Lo, Tainan (TW); Hung-Ching Lee, Tainan (TW); Hung-Wen Lin, Tainan (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 106 days.

(21) Appl. No.: 18/430,578

(22) Filed: Feb. 1, 2024

(65) Prior Publication Data
US 2024/0294071 A1    Sep. 5, 2024

Related U.S. Application Data

(60) Provisional application No. 63/449,051, filed on Mar. 1, 2023.

(30) Foreign Application Priority Data

Nov. 30, 2023   (CN) .......................... 202311626996.2

(51) Int. Cl.
*B60K 35/70* (2024.01)
*B60K 35/22* (2024.01)

(52) U.S. Cl.
CPC .............. *B60K 35/70* (2024.01); *B60K 35/22* (2024.01); *B60K 2360/691* (2024.01); *B60K 2360/693* (2024.01)

(58) Field of Classification Search
CPC .. B60K 35/70; B60K 35/22; B60K 2360/691; B60K 2360/693; B60K 35/50; B65D 81/051; B65D 85/30
See application file for complete search history.

(56) References Cited

U.S. PATENT DOCUMENTS

| | | | |
|---|---|---|---|
| 10,405,440 B2 * | 9/2019 | Burdoucci | H04M 1/185 |
| 10,953,834 B2 * | 3/2021 | Jaradi | B60R 21/205 |
| 2009/0266635 A1 * | 10/2009 | Sato | B60K 37/00 |
| | | | 296/97.7 |
| 2010/0124005 A1 * | 5/2010 | Hotary | B60K 35/22 |
| | | | 361/679.01 |
| 2010/0188204 A1 * | 7/2010 | Okada | G03B 21/28 |
| | | | 340/457.1 |

(Continued)

FOREIGN PATENT DOCUMENTS

| CN | 202827354 | 3/2013 |
|---|---|---|
| CN | 204316557 | 5/2015 |

(Continued)

*Primary Examiner* — Fernando Alcon
(74) *Attorney, Agent, or Firm* — JCIPRNET

(57) ABSTRACT

An electronic device is provided on a transport device, including a fastener, an electronic unit, and a first air bag. The electronic unit includes an upper surface and a lower surface opposite to the upper surface. The upper surface is connected to the fastener. The fastener and the first air bag are respectively connected to two opposite sides of the electronic unit. When the first air bag is inflated and expanded, the first air bag covers the lower surface of the electronic unit.

14 Claims, 8 Drawing Sheets

(56) References Cited

U.S. PATENT DOCUMENTS

| | | | |
|---|---|---|---|
| 2014/0001084 A1* | 1/2014 | Zhao | B65D 85/30 |
| | | | 206/722 |
| 2017/0050602 A1* | 2/2017 | Vinton | B60N 2/809 |
| 2019/0071112 A1* | 3/2019 | Toddenroth | B60R 21/2035 |
| 2019/0077357 A1* | 3/2019 | Rupp | B60K 35/22 |
| 2020/0283153 A1 | 9/2020 | Humbert et al. | |
| 2022/0314793 A1* | 10/2022 | Howard, Jr. | B60K 35/60 |
| 2022/0348159 A1* | 11/2022 | Mihm | B60K 37/20 |
| 2022/0371440 A1* | 11/2022 | Hasegawa | B60R 11/02 |
| 2024/0131929 A1* | 4/2024 | Inoue | B60R 11/0235 |
| 2024/0239288 A1* | 7/2024 | Rommelfanger | B60R 21/20 |
| 2024/0249697 A1* | 7/2024 | Krishnan | G06F 3/017 |
| 2025/0224911 A1* | 7/2025 | Kaburlasos | G06F 1/3231 |

FOREIGN PATENT DOCUMENTS

| | | | | |
|---|---|---|---|---|
| CN | 213241789 U | * | 5/2021 | |
| CN | 110481449 | | 4/2022 | |
| KR | 20180132462 A | * | 12/2018 | H01H 3/00 |
| WO | WO-2004058540 A2 | * | 7/2004 | B60K 35/22 |
| WO | WO-2020244933 A1 | * | 12/2020 | B60K 35/20 |

\* cited by examiner

ELECTRONIC DEVICE PROVIDED ON TRANSPORT DEVICE

CROSS-REFERENCE TO RELATED APPLICATION

This application claims the priority benefit of the U.S. provisional application Ser. No. 63/449,051, filed on Mar. 1, 2023, and the priority benefit of China application serial no. 202311626996.2, filed on Nov. 30, 2023. The entirety of each of the above-mentioned patent applications is hereby incorporated by reference herein and made a part of this specification.

BACKGROUND

Technical Field

The disclosure relates to an electronic device, and more particularly to an electronic device provided on a transport device.

Description of Related Art

With the development of technology, electronic devices on transport devices, such as display devices, have become commonly used electronic devices. However, how to stabilize the display device while the transport device is in motion and how to protect the passengers in the event of an accident has become a topic to be studied.

SUMMARY

This disclosure is directed to an electronic device provided on a transport device, which has shockproof and/or anti-collision functions.

According to the embodiment of the disclosure, the electronic device provided on the transport device includes a fastener, an electronic unit, and a first air bag. The electronic unit includes an upper surface and a lower surface opposite to the upper surface. The upper surface is connected to the fastener. The fastener and the first air bag are respectively connected to two opposite sides of the electronic unit. When the first air bag is inflated and expanded, the first air bag covers the lower surface of the electronic unit.

According to the embodiment of the disclosure, the electronic device provided on the transport device includes a fastener, an electronic unit, and a first buffer member. The electronic unit includes an upper surface, and the upper surface is connected to the fastener. The fastener and the first buffer member are respectively connected to two opposite sides of the electronic unit.

According to the embodiment of the disclosure, the electronic device provided on the transport device includes a fastener, an electronic unit, and a shock absorbing structure. The fastener is provided on a top portion of the transport device. The shock absorbing structure is connected between the fastener and the electronic unit.

Based on the above, in the embodiment of the disclosure, the fastener and the first air bag are respectively connected to two opposite sides of the electronic unit. Thus, when the first air bag inflates and expands, that is, when the transport device collides with an impact object, the first air bag may cover the lower surface of the electronic unit, thereby protecting passengers and reducing the force of the passenger hitting the electronic unit. Thus, the electronic device of the disclosure may have anti-collision function.

In order to make the above-mentioned features and advantages of the disclosure comprehensible, embodiments accompanied with drawings are described in detail below.

DESCRIPTION OF THE EMBODIMENTS

Figure 1:
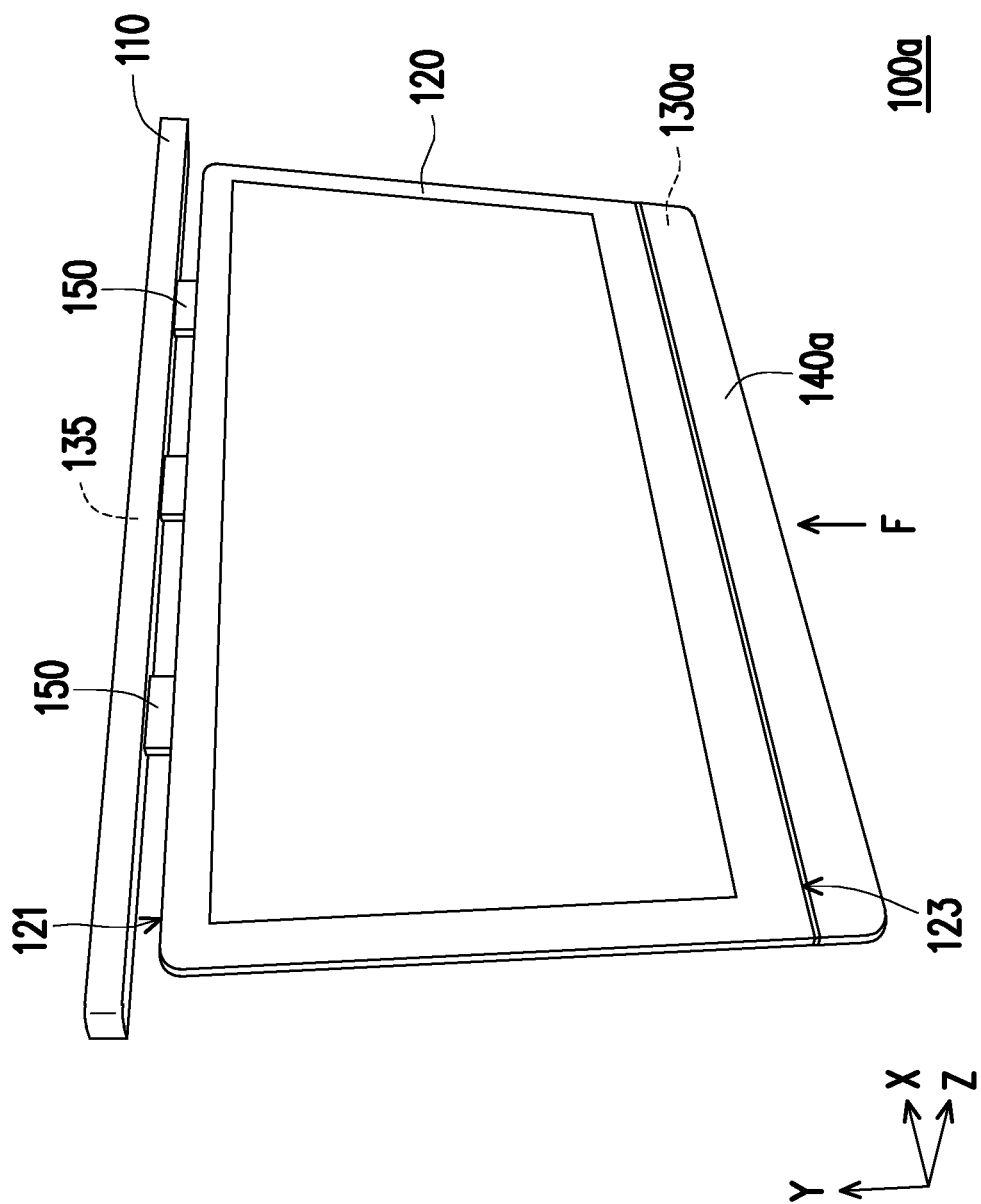
FIG. 1 is a perspective schematic view of an electronic device provided on a transport device according to one embodiment of the disclosure.

The disclosure can be understood by referring to the following detailed description in conjunction with the accompanying drawings. It should be noted that, for the ease of understanding by the readers and for the brevity of the accompanying drawings, multiple drawings in the disclosure only depict a portion of the electronic device, and the specific elements in the drawings are not drawn according to the actual scale. In addition, the number and size of each of the elements in the figures are for illustration purposes only, and are not intended to limit the scope of the disclosure.

Certain terms may be used throughout the disclosure and the appended claims to refer to specific elements. It should be understood by those skilled in the art that electronic device manufacturers may refer to the same elements by different names. The disclosure does not intend to distinguish between elements that have the same function but have different names.

In the following description and claims, words such as "comprising" and "including" are open-ended words, so they should be interpreted as meaning "including but not limited to . . . ".

In addition, relative terms, such as "below" or "bottom" and "above" or "top," may be used in the embodiments to describe a relative relationship of one element of the drawings to another element. It is understood that if the device in the drawing is turned upside down, elements described as being on the "lower" side would then be elements described as being on the "upper" side.

In some embodiments of the disclosure, terms related to joining and connecting, such as "connected", "interconnected", etc., unless otherwise defined, may mean that two structures are in direct contact, or may also mean that two structures are not in direct (indirect) contact, in which there are other structures located between these two structures. The terms related to joining and connecting can also include the case where both structures are movable, or both structures are fixed. In addition, the term "coupling" includes the transfer of energy between two structures through direct or indirect electrical connection, or the transfer of energy between two separate structures through mutual induction.

It should be understood that when an element or layer is referred to as being "on" or "connected to" another element or layer, it may be directly on or directly connected to this other element or layer, or there may be an intervening element or layer in between (indirect case). In contrast, when an element is referred to as being "directly on" or "directly connected to" another element or layer, there are no intervening elements or layers present.

In this disclosure, the terms "about", "equal to", "equal" or "same", "substantially" or "generally" are interpreted as within 20% of a given value or range, or interpreted as within 10%, 5%, 3%, 2%, 1%, or 0.5% of the given value or range.

As used herein, the terms "film" and/or "layer" may refer to any continuous or discontinuous structure and material (such as a material deposited by the methods disclosed herein). For example, films and/or layers may include two-dimensional materials, three-dimensional materials, nanoparticles, or even partial or complete molecular layers, or partial or complete atomic layers, or atomic and/or molecular clusters. The film or layer may include a material or layer having pinholes, which may be at least partially continuous.

Although the terms "first", "second", "third", . . . may be used to describe various constituent elements, the constituent elements are not limited by the terms. The terms are only used to distinguish a single constituent element from other constituent elements in the specification. The same terms may not be used in the claim, but replaced by first, second, third . . . according to the order in which the elements are declared in the claim. Therefore, in the following description, the first constituent element may be the second constituent element in the claim.

In the disclosure, the thickness, length, and width may be measured by adopting a measurement method such as an optical microscope, and the thickness can be measured from a cross-sectional image in an electronic microscope, but not limited thereto. In addition, any two values or directions used for comparison may have certain errors. If a first value is equal to a second value, it implies that there may be an error of about 10% between the first value and the second value; if a first direction is perpendicular to a second direction, an angle between the first direction and the second direction may be between 80 degrees and 100 degrees; if the first direction is parallel to the second direction, an angle between the first direction and the second direction may be between 0 degrees and 10 degrees.

Unless otherwise defined, all terms (including technical and scientific terms) used herein have the same meaning as commonly understood by one of ordinary skill in the art to which this disclosure belongs. It is understood that these terms, such as those defined in commonly used dictionaries, should be interpreted as having meanings consistent with the relevant art and the background or context of the disclosure, and should not be interpreted in an idealized or overly formal manner, unless otherwise defined herein.

It should be noted that, in the following embodiments, the technical features in several different embodiments can be replaced, reorganized, and mixed to complete other embodiments without departing from the spirit of the disclosure.

The electronic device of this disclosure may include a display device, an antenna device, a sensing device, a light emitting device, or a splicing device, but is not limited thereto. The electronic device may include a bendable or flexible electronic device. The electronic device may include, for example, liquid crystal, light emitting diode, fluorescence, phosphor, other suitable display media, or a combination of the above, but is not limited thereto. The electronic device may include electronic elements. The electronic element can include passive elements, active elements, or a combination of the foregoing, such as capacitors, resistors, inductors, variable capacitors, filters, diodes, transistors, sensors, MEMS, liquid crystal chips, etc., but not limited thereto. The diodes may include light emitting diodes or non-light emitting diodes. The diodes include P-N. junction diodes, PIN diodes, or constant current diodes. The light emitting diode may include, for example, an organic light-emitting diode (OLED), a mini light-emitting diode (mini LED), a micro light-emitting diode (micro LED), a quantum dot light-emitting diode (quantum dot LED), or other suitable materials, or a combination of the foregoing, but not limited thereto. The sensor may, for example, include capacitive sensors, optical sensors, electromagnetic sensors, fingerprint sensors (FPS), touch sensors, antennas, or pen sensors, etc., but not limited thereto. Hereinafter, a display device is used as the electronic device to illustrate this disclosure, but this disclosure is not limited thereto.

References of the exemplary embodiments of the disclosure are to be made in detail. Examples of the exemplary embodiments are illustrated in the drawings. If applicable, the same reference numerals in the drawings and the descriptions indicate the same or similar parts.

Figure 2:
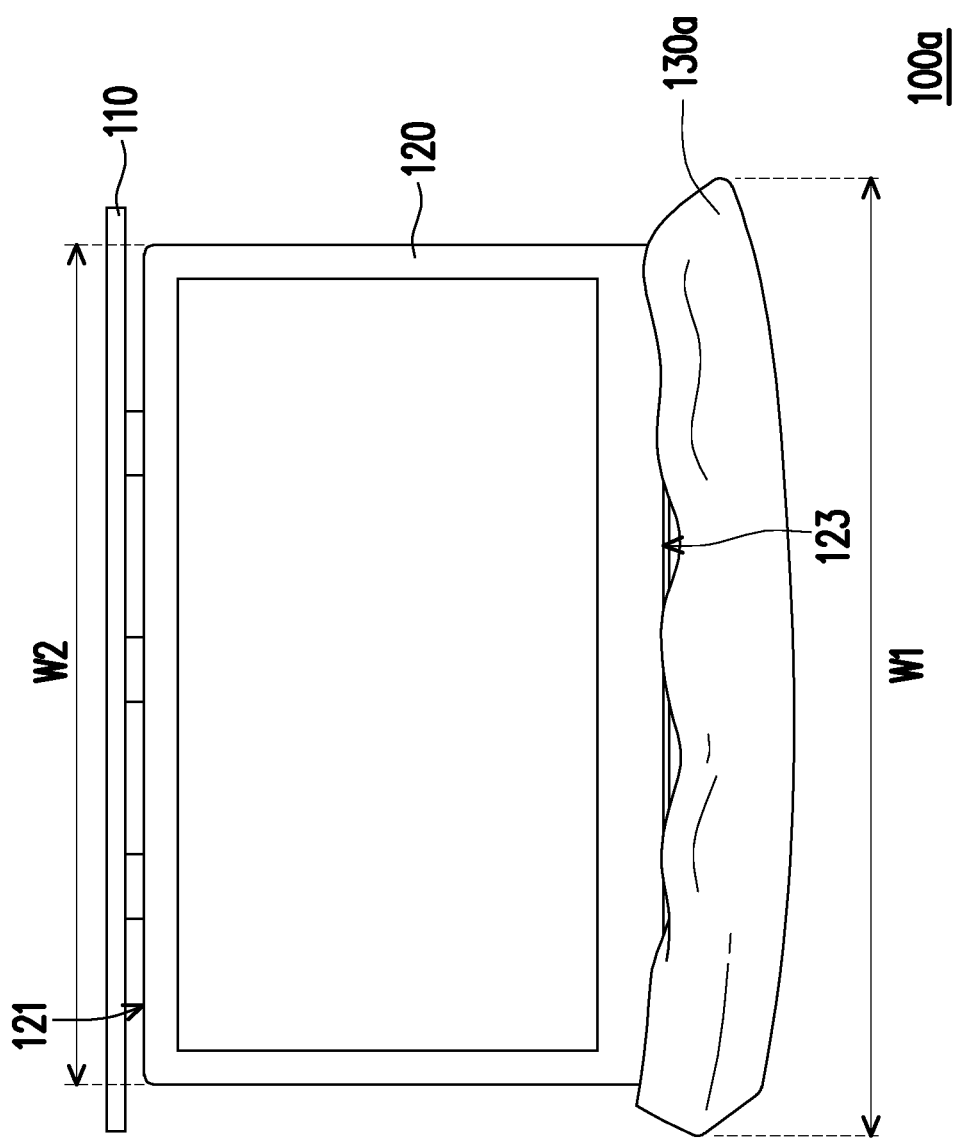
FIG. 2 is a schematic view of the first air bag in the electronic device in FIG. 1 being inflated and expanded.
Figure 3:
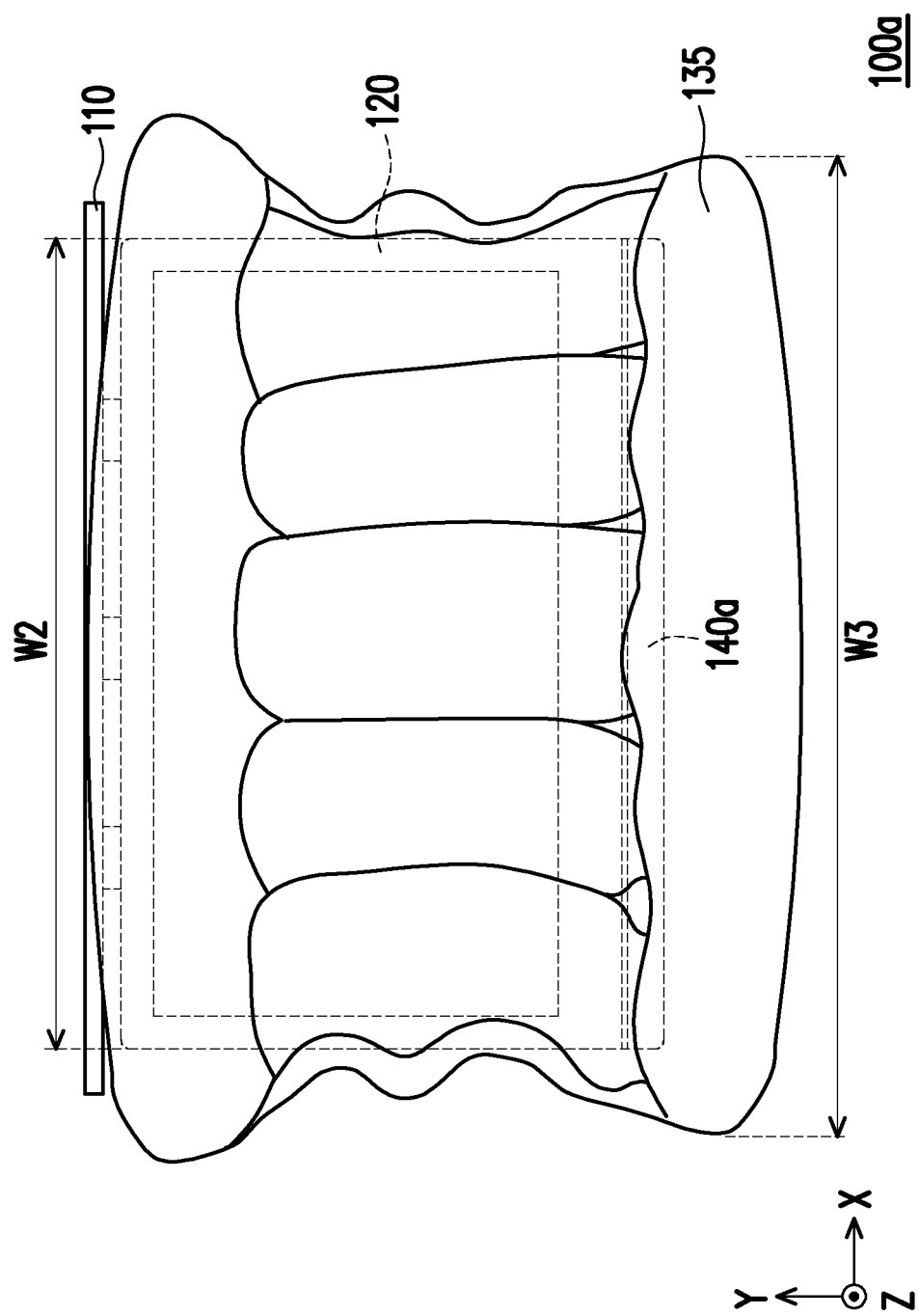
FIG. 3 is a schematic view of the second air bag in the electronic device in FIG. 1 being inflated and expanded.

FIG. 1 is a perspective schematic view of an electronic device provided on a transport device according to one embodiment of the disclosure. FIG. 2 is a schematic view of the first air bag in the electronic device in FIG. 1 being inflated and expanded. FIG. 3 is a schematic view of the second air bag in the electronic device in FIG. 1 being inflated and expanded.

Referring to FIG. 1 and FIG. 2 at the same time, in this embodiment, the electronic device 100a provided on the transport device includes a fastener 110, an electronic unit 120, and a first air bag 130a. The electronic unit 120 includes an upper surface 121 and a lower surface 123 opposite to the upper surface 121. The upper surface 121 is connected to the fastener 110. The fastener 110 and the first air bag 130a are respectively connected to two opposite sides of the electronic unit 120. When the first air bag 130a is inflated and expanded, the first air bag 130a covers the lower surface 123 of the electronic unit 120.

Specifically, the electronic device 100a is, for example, a display device, which may be provided on a transport device such as a vehicle for use by passengers, but is not limited thereto. In one embodiment, the fastener 110 may be, for example, a portion of the transport device, such as a roof, or may be an independent entity and fixed on the transport device, but is not limited thereto. The electronic unit 120 may include an outer casing and a powered device in the outer casing, such as screen, but is not limited thereto. The upper surface 121 of the electronic unit 120 is the side farthest from the ground plane after the electronic unit 120 is installed on the transport device, and the lower surface 123 of the electronic unit 120 is the opposite side of the upper surface 121.

When the transport device collides with an impact object, the first air bag 130a pops up and inflate to cover the lower surface 123 of the electronic unit 120. Furthermore, when the first air bag 130a is inflated and expanded, in a horizontal direction (e.g., X-axis direction), the first air bag 130a may have a first maximum width W1, while the electronic unit 120 may have a second maximum width W2, and the first maximum width W1 is greater than the second maximum width W2. In more detail, the area of the inflated and expanded first air bag 130a on a horizontal plane (e.g., XZ plane) is larger than the area of the lower surface 123 of the electronic unit 120 on that plane (e.g., XZ plane), that is, an inflated and expanded first air bag 130a may be located between the electronic unit 120 and the passenger, thereby reducing the impact force of the passenger on the electronic unit lower surface 123. In other words, when the transport device collides with an impact object, the inflated and expanded first air bag 130a may reduce the force of the passenger hitting the lower surface 123 of the electronic unit 120 from bottom to top (e.g., F direction) or the force of the passenger hitting a portion of the lower surface 123 of the electronic unit 120 from back to front (e.g., Z direction). In one embodiment, the first maximum width W1 of the first air bag 130a after inflation may also be equal to the second maximum width W2 of the electronic unit 120.

Furthermore, the electronic device 100a provided on the transport device in this embodiment may further include a first buffer member 140a, provided on the two opposite sides of the electronic unit 120 along with the fastener 110. In one embodiment, the first air bag 130a may be provided in the first buffer member 140a, but is not limited thereto. Referring to FIG. 1 and FIG. 2 at the same time, when the first air bag 130a is inflated and expanded, an area of the first air bag (e.g., area of the XZ plane or the XY plane) may be larger than an area of the first buffer member 140a, and the first air bag 130a may cover a portion of the electronic unit 120 upward in the Y-axis direction, but is not limited thereto. In one embodiment, when the first air bag 130a is inflated and expanded, the first air bag 130a may cover the first buffer member 140a (e.g., in the Y-axis direction), but is not limited thereto. In one embodiment, the first air bag 130a may cover the lower surface 123 of the electronic unit 120 in the Z-axis direction, and may extend upward to partially cover the front side of the electronic unit 120, but is not limited thereto.

In one embodiment, the first air bag 130a may not be provided in the first buffer member 140a, but the first air bag 130a may be provided elsewhere. The first buffer member 140a may be, for example, a deformable structure such as rubber or spring, but is not limited thereto, which has an elastic shock-absorbing effect and may be provided at an edge of the electronic unit 120, reducing the force of the passenger hitting the electronic unit 120 and thereby protecting the passenger.

In addition, referring to FIG. 1 and FIG. 3 at the same time, in this embodiment, the electronic device 100a provided on the transport device may further include a second air bag 135 provided in the fastener 110. When the second air bag 135 is inflated and expanded, in the horizontal direction (e.g., X-axis direction), the second air bag 135 has a third maximum width W3, and the third maximum width W3 is greater than the second maximum width W2. That is, the third maximum width W3 of the second air bag 135 being inflated and expanded is greater than the second maximum width W2 of the electronic unit 120, thereby, when the transport device collides with an impact object, the inflated second air bag 135 may protect the passenger and reduce the impact force hitting the electronic unit 120. In other words, by providing the second air bag 135, the impact force may be reduced and thereby protecting the passenger. In one embodiment, the third maximum width W3 of the second air bag 135 being inflated and expanded may also be equal to the second maximum width W2 of the electronic unit 120.

In one embodiment, when the transport device collides with an impact object, the height of the second air bag 135 is also higher than the electronic unit 120 in the vertical direction (e.g., Y-axis direction). That is, when the second air bag 135 is inflated and expanded, in the Z-axis direction, the second air bag 135 covers the front side of the electronic unit 120 (e.g., the surface on the XY plane), that is, the inflated and expanded second air bag 135 may be located between the electronic unit 120 and the passenger, but is not limited thereto, in order to achieve the effect of protecting the viewer. In one embodiment, when the second air bag 135 is inflated and expanded, the area of the second air bag 135 on the front side (e.g., XY plane) may be larger than the area of the electronic unit 120, but is not limited thereto. In one embodiment, when the second air bag 135 is inflated and expanded, the area of the second air bag 135 may be larger than the area of the electronic unit 120 plus the area of the first buffer member 140a, but is not limited thereto. In one embodiment, when the second air bag 135 is inflated and expanded, the second air bag 135 may cover the front side (e.g., XY plane) of the electronic unit 120 and extend to cover the surface of the first buffer member 140a, but is not limited thereto.

It should be noted that in one embodiment, the first air bag 130a and the second air bag 135 may be selectively provided, that is, only the first air bag 130a may be provided, or only the second air bag may be provided, or both the first air bag 130a and the second air bag 135 may be provided according to the needs, which is not limited herein.

In addition, referring to FIG. 1, in order to enable the electronic device 100a to have a shock-proof function, the electronic device 100a of this embodiment may also include at least one shock absorbing structure 150 (multiple is schematically shown) connected between the fastener 110 and the electronic unit 120. The shock absorbing structure 150 may be, for example, a single-axis shock absorbing structure, a rubber, a magnetic levitation, or a spring, but it is not limited thereto, which allows the electronic unit 120 to absorb shock in a bumpy environment to maintain the stability of the display screen. In other words, when the shock-proof function is not required, the electronic device 100a may not be provided with the shock absorbing structure 150, so the shock absorbing structure 150 is a selectively provided component.

In short, this embodiment may reduce the impact force by providing the first air bag 130a, and/or the first buffer member 140a, and/or the second air bag 135 to actively protect the passenger.

It is to be noted that the following embodiments use the reference numerals and a part of the contents of the above embodiments, and the same reference numerals are used to denote the same or similar elements, and the description of the same technical contents is omitted. For the description of the omitted part, reference may be made to the above embodiments, and details are not described in the following embodiments.

Figure 4:
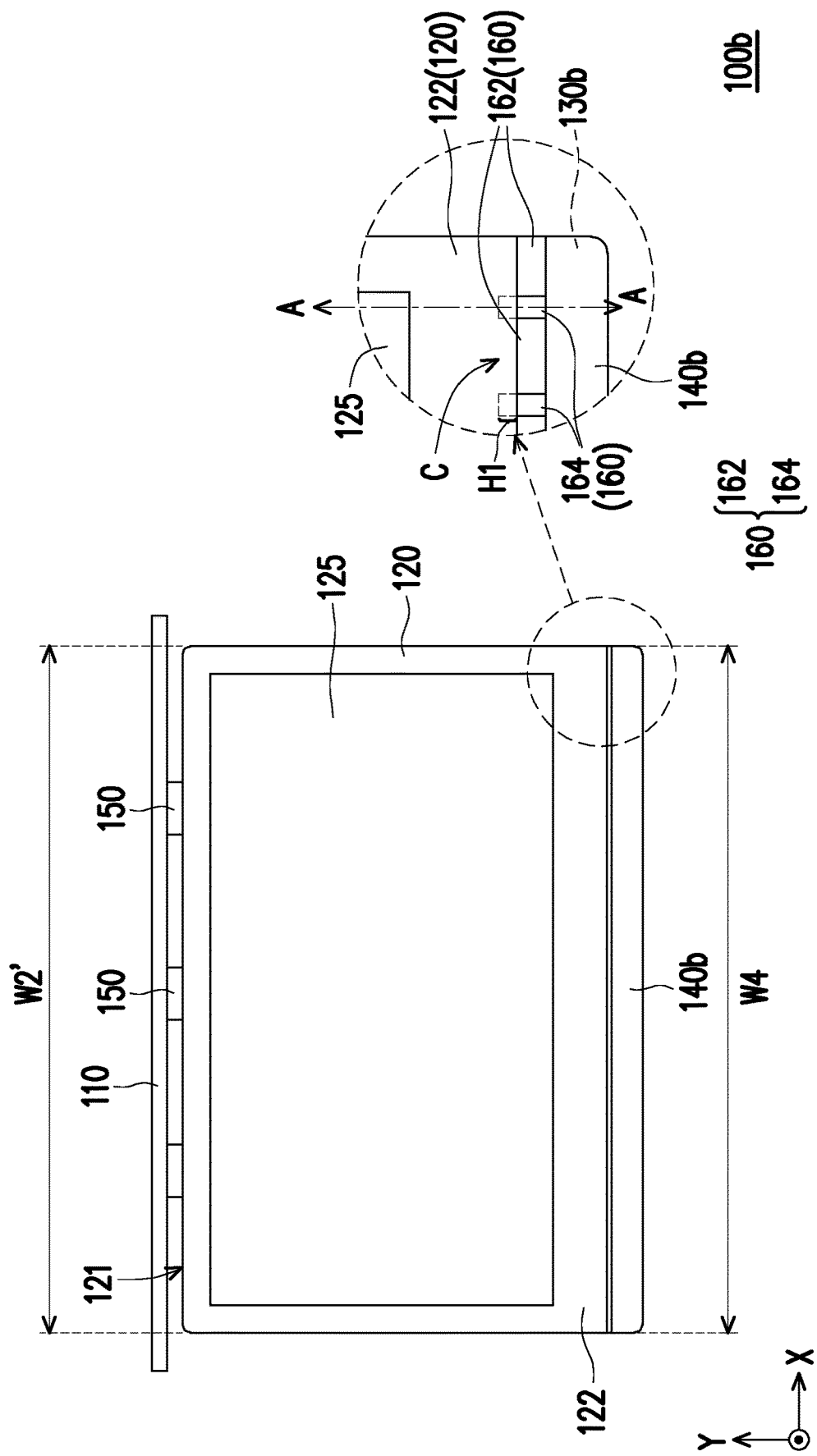
FIG. 4 is a front schematic view of an electronic device provided on a transport device according to another embodiment of the disclosure.
Figure 5:
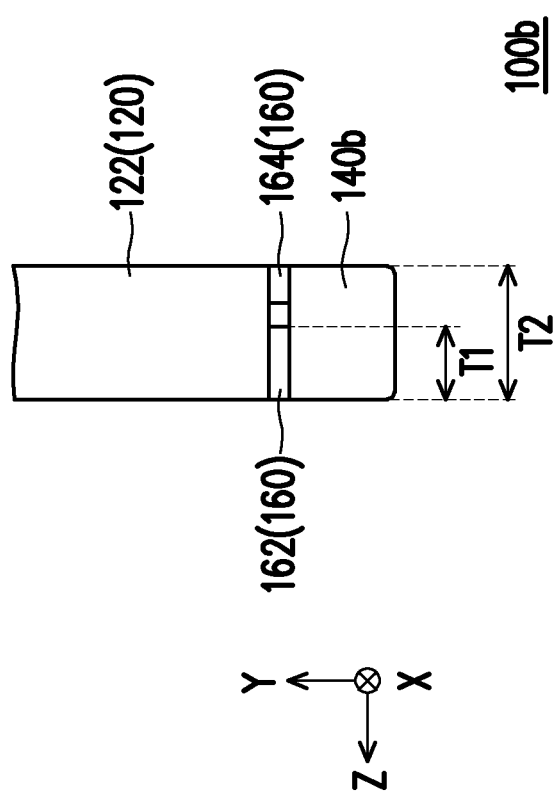
FIG. 5 is a side schematic view of the electronic device in FIG. 4.
Figure 6:
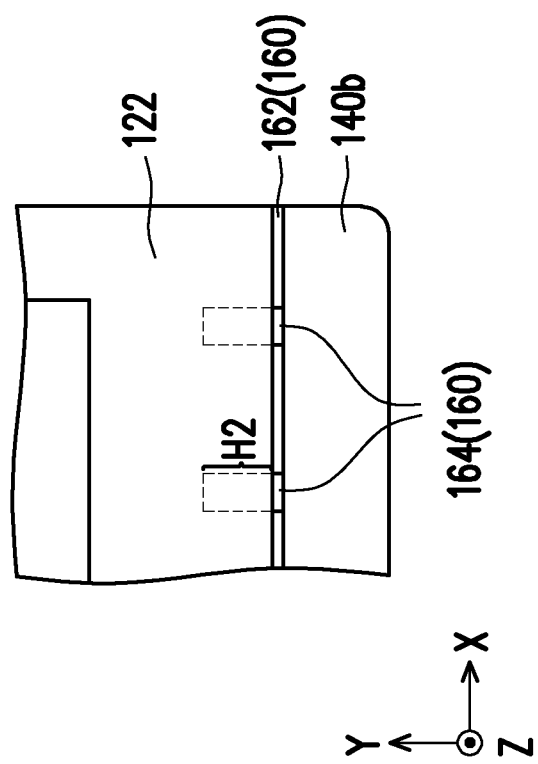
FIG. 6 is a schematic view of the displacement of the moving member of the electronic device in FIG. 4.

FIG. 4 is a front schematic view of an electronic device provided on a transport device according to another embodiment of the disclosure. FIG. 5 is a side schematic view of the electronic device in FIG. 4. FIG. 6 is a schematic view of the displacement of the moving member of the electronic device in FIG. 4. It should be noted that FIG. 5 is a side view along the line A-A in FIG. 4.

First, referring to FIG. 4, in this embodiment, the electronic device 100b provided on the transport device includes a fastener 110, an electronic unit 120, and a first buffer member 160. The electronic unit 120 includes an upper surface 121, and the upper surface 121 is connected to the fastener 110. The fastener 110 and the first buffer member 160 are respectively connected to two opposite sides of the electronic unit 120.

Specifically, the first buffer member 160 may be, for example, a deformable structure such as rubber or spring, but is not limited thereto, which has an elastic shock-absorbing effect and may be provided at the edge of the electronic unit 120, reducing the impact force and thereby protecting the passenger. In one embodiment, shock-absorbing materials may also be provided around the electronic unit 120 to achieve anti-collision and/or buffering effects. The first buffer member 160 may include a plurality of sub buffer members 162 separated from each other, but is not limited thereto. In one embodiment, the first buffer member 160 may also be a unibody structure.

Refer to FIG. 4 again, in this embodiment, the first buffer member 160 may include a moving member 164, the electronic unit 120 includes a bottom 122, and the bottom 122 includes a first accommodating portion C corresponding to the moving member 164. Furthermore, the electronic device 100b of this embodiment may further include a second buffer member 140b, where the first buffer member 160 is connected between the electronic unit 120 and the second buffer member 140b. In one embodiment, the second buffer member 140b may also be, for example, a deformable structure such as rubber or spring, but is not limited thereto. The maximum width W4 of the second buffer member 140b may be greater than or equal to the maximum width W2' of the electronic unit 120.

In addition, referring to FIG. 5, the first buffer member 160 includes a sub buffer member 162, the sub buffer member 162 has a first thickness T1, while the second buffer member 140b has a second thickness T2, and the first thickness T1 is less than the second thickness T2. In this way, the force of collision with the bottom of the electronic unit 120 when the passenger move in the transport device may be reduced. In addition, in one embodiment, as shown in FIG. 4, the electronic device 100b of this embodiment further includes an air bag 130b, which is provided in the second buffer member 140b. In this way, when the transport device collides with an impact object, the inflated and expanded air bag 130b may reduce the force of the passenger hitting the lower surface of the electronic unit 120 from bottom to top (e.g., Y direction) or the force of the passenger hitting a portion of the bottom 122 of the electronic unit 120 from back to front (e.g., Z direction).

That is, the first buffer member 160 of this embodiment is located between the electronic unit 120 and the second buffer member 140b, where the first buffer member 160 includes at least one sub buffer member 162 and at least one moving member 164. In one embodiment, the number of sub buffer members 162 and moving members 164 is multiple, and they may be arranged in a staggered manner, but not limited thereto. In one embodiment, there may be one sub buffer member 162 and multiple moving members 164, and the moving members 164 are provided adjacent to the sub buffer member 162, but are not limited thereto. In one embodiment, the material of the sub buffer member 162 may be, for example, a deformable structure such as rubber or spring, but is not limited thereto, which has an elastic shock-absorbing effect. In one embodiment, the material of the moving member 164 may be, for example, a deformable structure such as rubber or spring, but is not limited thereto, which has an elastic shock-absorbing effect. Referring to FIG. 4 and FIG. 6 at the same time, in one embodiment, the moving member 164 may have relative displacement with the electronic unit 120, or the moving member 164 may have relative displacement with the second buffer member 140b. That is, in one embodiment, the moving member 164 may be included in the electronic unit 120, while the electronic unit 120 has a corresponding accommodating space (i.e., the first accommodating portion C), and in the event of collision, the moving member 164 has relative displacement with the electronic unit 120. Alternatively, in one embodiment (not shown), the moving member 164 may also be included in the second buffer member 140b, while the second buffer member 140b has a corresponding accommodating space, and in the event of collision, the moving member 164 has relative displacement with the second buffer member 140b.

Further, referring to FIG. 4 and FIG. 6 at the same time, the moving member 164 and the bottom 122 of the electronic unit 120 have a first height H1. When a collision occurs, the moving member 164 and the bottom 122 of the electronic unit 120 have a second height H2, and the second height H2 is greater than the first height H1. That is, in the event of collision, the moving member 164 moves towards the first accommodating portion C of the electronic unit 120, and the second height H2 is greater than the first height H1, that is, the moving member 164 may have relative displacement relative to the electronic unit 120, but not limited thereto. In one embodiment (not shown), the moving member 164 and the top surface of the second buffer member 140b have a third height. When a collision occurs, the moving member 164 and the top surface of the second buffer member 140b have a fourth height, and the fourth is greater than the third height. That is, in the event of collision, the moving member 164 moves towards the second accommodating portion of the second buffer member 140b, and the fourth height is greater than the third height, that is, the moving member 164 may have relative displacement relative to the second buffer member 140b, but not limited thereto.

Figure 7:
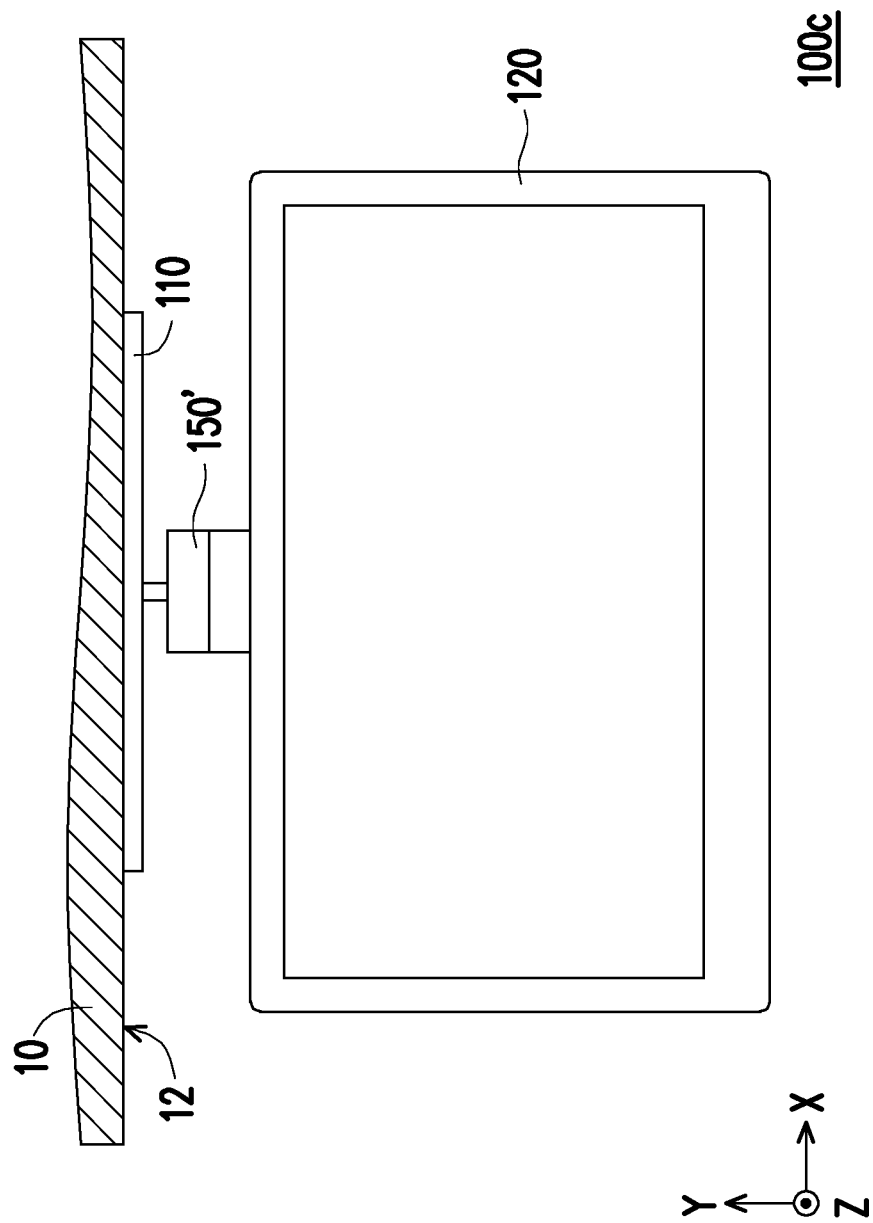
FIG. 7 is a front schematic view of an electronic device provided on a transport device according to another embodiment of the disclosure.
Figure 8:
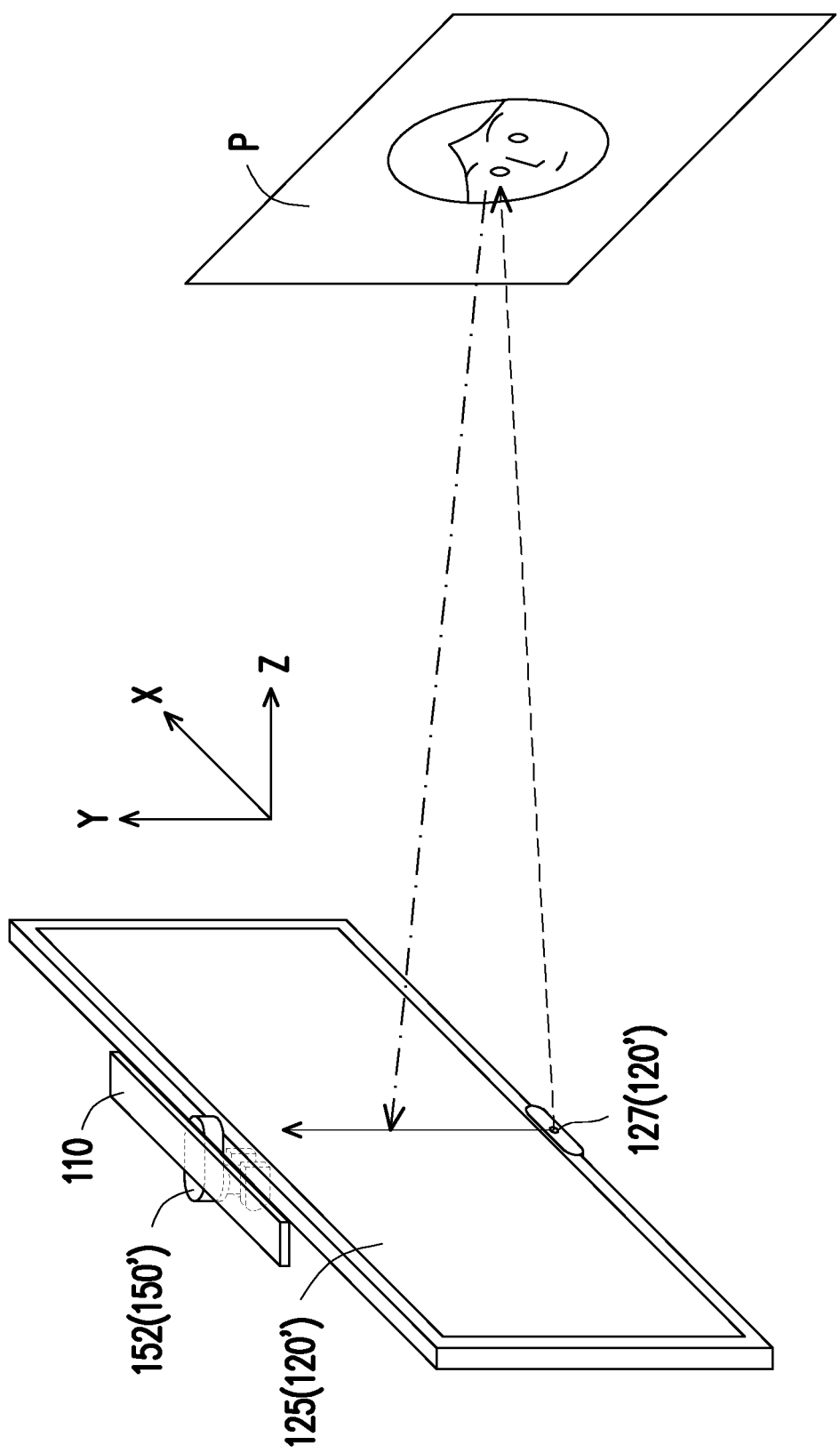
FIG. 8 is a schematic view of the relative positions of the electronic unit of the electronic device in FIG. 7 and a face plane.

FIG. 7 is a front schematic view of an electronic device provided on a transport device according to another embodiment of the disclosure. FIG. 8 is a schematic view of the relative positions of the electronic unit of the electronic device in FIG. 7 and a face plane.

First, referring to FIG. 7 and FIG. 8 at the same time, in this embodiment, the electronic device 100c provided on the transport device includes a fastener 110, an electronic unit 120', and a shock absorbing structure 150'. The fastener 110 is provided on a top portion 12 of the transport device 10. The shock absorbing structure 150' is connected between the fastener 110 and the electronic unit 120'.

Specifically, the fastener 110 may be, for example, a roof bracket, and the top portion 12 of the transport device 10 may be, for example, the inner surface of the transport device 10, but is not limited thereto. The shock absorbing structure 150' may be, for example, a multi-axis structure, a rubber, a magnetic levitation, or a spring, but is not limited thereto, so that the electronic unit 120' may be fixed on the fastener 110, allowing the electronic unit 120' to absorb shock in a bumpy environment and the electronic unit 120' to be in a stable state to achieve a better viewing experience. In one embodiment, similar to the shock absorbing structures 150 in FIG. 1, multiple shock absorbing structures 150' may also be provided. In one embodiment, the shock absorbing structure 150' may be, for example, directly provided on the inner surface of the roof, but is not limited thereto.

Furthermore, the electronic unit 120' of this embodiment includes a first detection system 127, and the first detection system 127 is configured to provide a signal to an adjustment portion 152. The first detection system 127 may be, for example, a sensor. In one embodiment, the sensor may be an optical sensor, such as a charge coupled device (CCD) image sensor or a complementary metal-oxide semiconductor (CMOS) image sensor (CIS), but not limited thereto. In addition, the electronic device 100c of this embodiment further includes an adjustment portion 152, and the adjustment portion 152 rotates the electronic unit 120' according to the signal.

That is, the first detection system 127 of the electronic unit 120' of this embodiment may be, for example, a charge coupled device (CCD) image sensor, which may detect the face or eyes of the viewer. According to the returned message calculated by the first detection system 127, the adjustment portion 152 performs angle adjustment on the electronic unit 120', such as angle rotation or plane displacement, so that the screen 125 and the face plane P of the passenger's face or eyes are maintained at the best viewing angle. For example, the viewing angle is: 25 degrees up, 30 degrees down, 30 degrees left and right, but not limited thereto.

In short, the electronic device 100c of this embodiment may reduce the discomfort caused by excessive vibration of the pavement through the shock absorbing structure 150', and the best viewing angle may be maintained through the first detection system 127, so that the user may view the electronic unit 120' at a stable angle. Even the passenger's face or eyes may be tracked through providing the first detection system 127, and then active detection feedback actively adjusts the screen angle of the electronic unit 120' through the adjustment portion 152 of the shock absorbing structure 150', so as to face the passengers at the best display angle.

Based on the above, in one embodiment of the disclosure, the fastener and the first air bag are respectively connected to two opposite sides of the electronic unit. Thus, when the first air bag inflates and expands, that is, when the transport device collides with an impact object, the first air bag may cover the lower surface of the electronic unit, thereby protecting passengers and reducing the force of the passenger hitting the electronic unit. Thus, the electronic device of the disclosure may have anti-collision function. In one embodiment of the disclosure, the first buffer member has an elastic shock-absorbing effect and may be provided on the two opposite sides of the electronic unit along with the fastener to avoid personal injury in the event of a collision. In one embodiment of the disclosure, the electronic device may alleviate the discomfort caused by excessive vibration of the pavement through a shock absorbing structure. Even the passenger's face or eyes may be tracked through providing the first detection system, and the screen angle of the electronic unit is actively adjusted through the adjustment portion of the shock absorbing structure, so as to face the passengers at the best display angle, allowing users to view the electronic unit at a stable angle.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments can still be modified, or parts or all of the technical features thereof can be equivalently replaced; however, these modifications or substitutions do not deviate the essence of the corresponding technical solutions from the scope of the technical solutions of the embodiments of the disclosure.

What is claimed is:

1. An electronic device provided on a transport device, comprising:
    a fastener;
    an electronic unit, comprising an upper surface and a lower surface opposite to the upper surface, the upper surface being connected to the fastener; and
    a first air bag, wherein the fastener and the first air bag are respectively connected to two opposite sides of the electronic unit, and when the first air bag is inflated and expanded, the first air bag covers the lower surface of the electronic unit.

2. The electronic device provided on the transport device according to claim 1, further comprising:
    a first buffer member, provided on the two opposite sides of the electronic unit along with the fastener.

3. The electronic device provided on the transport device according to claim 2, wherein the first air bag is provided in the first buffer member.

4. The electronic device provided on the transport device according to claim 2, wherein when the first air bag is inflated and expanded, an area of the first air bag after inflation is larger than an area of the first buffer member.

5. The electronic device provided on the transport device according to claim 1, wherein when the first air bag is inflated and expanded, in a horizontal direction, the first air bag after inflation has a first maximum width, the electronic unit has a second maximum width, and the first maximum width is greater than the second maximum width.

6. The electronic device provided on the transport device according to claim 5, further comprising:
    a second air bag, provided in the fastener, wherein when the second air bag is inflated and expanded, in the horizontal direction, the second air bag after inflation has a third maximum width, and the third maximum width is greater than the second maximum width.

7. The electronic device provided on the transport device according to claim 5, wherein on a plane, an area of the first air bag after inflation is larger than an area of the lower surface of the electronic unit on the plane.

8. The electronic device provided on the transport device according to claim 1, further comprising:
    at least one shock absorbing structure, connected between the fastener and the electronic unit.

9. An electronic device provided on a transport device, comprising:
    a fastener;
    an electronic unit, comprising an upper surface, the upper surface being connected to the fastener; and
    a first buffer member, wherein the fastener and the first buffer member are respectively connected to two opposite sides of the electronic unit, wherein the first buffer member comprises a moving member, the electronic unit comprises a bottom, and the bottom comprises a first accommodating portion corresponding to the moving member.

10. The electronic device provided on the transport device according to claim 9, wherein the moving member and the bottom of the electronic unit have a first height, and when a collision occurs, the moving member and the bottom of the electronic unit have a second height, and the second height is greater than the first height.

11. An electronic device provided on a transport device, comprising:
    a fastener;
    an electronic unit, comprising an upper surface, the upper surface being connected to the fastener;

a first buffer member, wherein the fastener and the first buffer member are respectively connected to two opposite sides of the electronic unit;

a second buffer member, wherein the first buffer member is connected between the electronic unit and the second buffer member.

12. The electronic device provided on the transport device according to claim 11, wherein a maximum width of the second buffer member is greater than or equal to a maximum width of the electronic unit.

13. The electronic device provided on the transport device according to claim 11, further comprising:

an air bag, provided in the second buffer member.

14. The electronic device provided on the transport device according to claim 11, wherein the first buffer member comprises a sub buffer member, the sub buffer member has a first thickness, while the second buffer member has a second thickness, and the first thickness is less than the second thickness.

* * * * *